US010647027B2

(12) United States Patent
Nies et al.

(10) Patent No.: US 10,647,027 B2
(45) Date of Patent: May 12, 2020

(54) PRESS FOR PRODUCTION OF A MOLDED PART AND METHOD FOR CHANGING A DIE ON A PRESS

(71) Applicant: SMS group GmbH, Duesseldorf (DE)

(72) Inventors: Norbert Nies, Neuss (DE); Nikolaus Hoppenkamps, Moenchengladbach (DE); Walter Solty, Hueckelhoven (DE)

(73) Assignee: SMS group GmbH, Duesseldorf (DE)

( * ) Notice: Subject to any disclaimer, the term of this patent is extended or adjusted under 35 U.S.C. 154(b) by 299 days.

(21) Appl. No.: 15/591,638

(22) Filed: May 10, 2017

(65) Prior Publication Data

US 2017/0239905 A1    Aug. 24, 2017

Related U.S. Application Data

(62) Division of application No. 14/006,780, filed as application No. PCT/DE2012/000311 on Mar. 26, 2012, now Pat. No. 9,724,846.

(30) Foreign Application Priority Data

Mar. 24, 2011   (DE) ........................ 10 2011 015 050

(51) Int. Cl.
| B29C 31/00 | (2006.01) |
| B30B 11/02 | (2006.01) |
| B30B 15/02 | (2006.01) |
| B29C 43/32 | (2006.01) |
| B30B 11/14 | (2006.01) |
| B29K 105/00 | (2006.01) |

(52) U.S. Cl.
CPC ............ B29C 31/006 (2013.01); B29C 43/32 (2013.01); B30B 11/02 (2013.01); B30B 11/14 (2013.01); B30B 15/028 (2013.01); *B29K 2105/251* (2013.01)

(58) Field of Classification Search
CPC ................................................... B29C 31/006
See application file for complete search history.

(56) References Cited

U.S. PATENT DOCUMENTS 5,219,319 A    6/1993  Katagiri et al.

FOREIGN PATENT DOCUMENTS

| AT | 008 232 U1 | 4/2006 |
| DE | 28 25 253 A1 | 12/1979 |
| DE | 41 42 352 A1 | 7/1992 |
| DE | 10 2005 027 296 B3 | 11/2006 |
| EP | 0 436 792 A2 | 7/1991 |
| JP | S48-046970 A | 7/1973 |
| JP | S58-107401 A | 6/1983 |
| RU | 1 771 880 A1 | 10/1992 |

OTHER PUBLICATIONS

International Search Report of PCT/DE2012/000311, dated Nov. 15, 2012 and revised on Jan. 3, 2013.
(Continued)

Primary Examiner — Larry W Thrower
(74) Attorney, Agent, or Firm — Collard & Roe, P.C.

(57) ABSTRACT

A press for producing a molded part from pourable material has an apparatus for driving a die that includes a cylinder unit having a cylinder housing and having a cylinder piston. The cylinder housing is the actuator of the cylinder unit and the cylinder piston is the stator of the cylinder unit.

17 Claims, 2 Drawing Sheets

(56) References Cited

OTHER PUBLICATIONS

English translation of the International Preliminary Report on Patentability and Written Opinion of the International Searching Authority of PCT/DE2012/000311, dated Oct. 3, 2013.
German Examination Report dated Jan. 25, 2012 in German Application No. 10 2011 015 050.1 with English translation of the relevant parts.

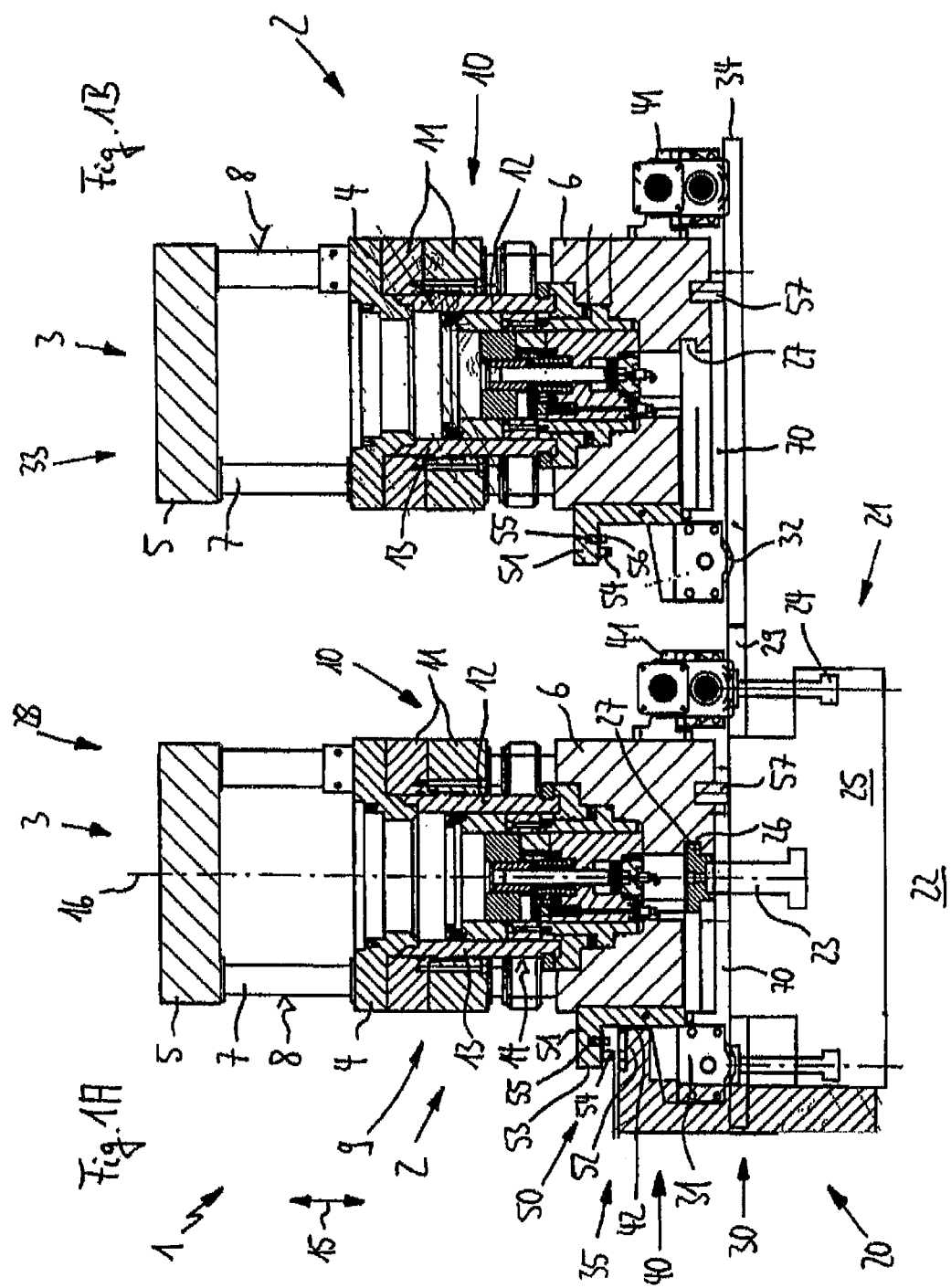

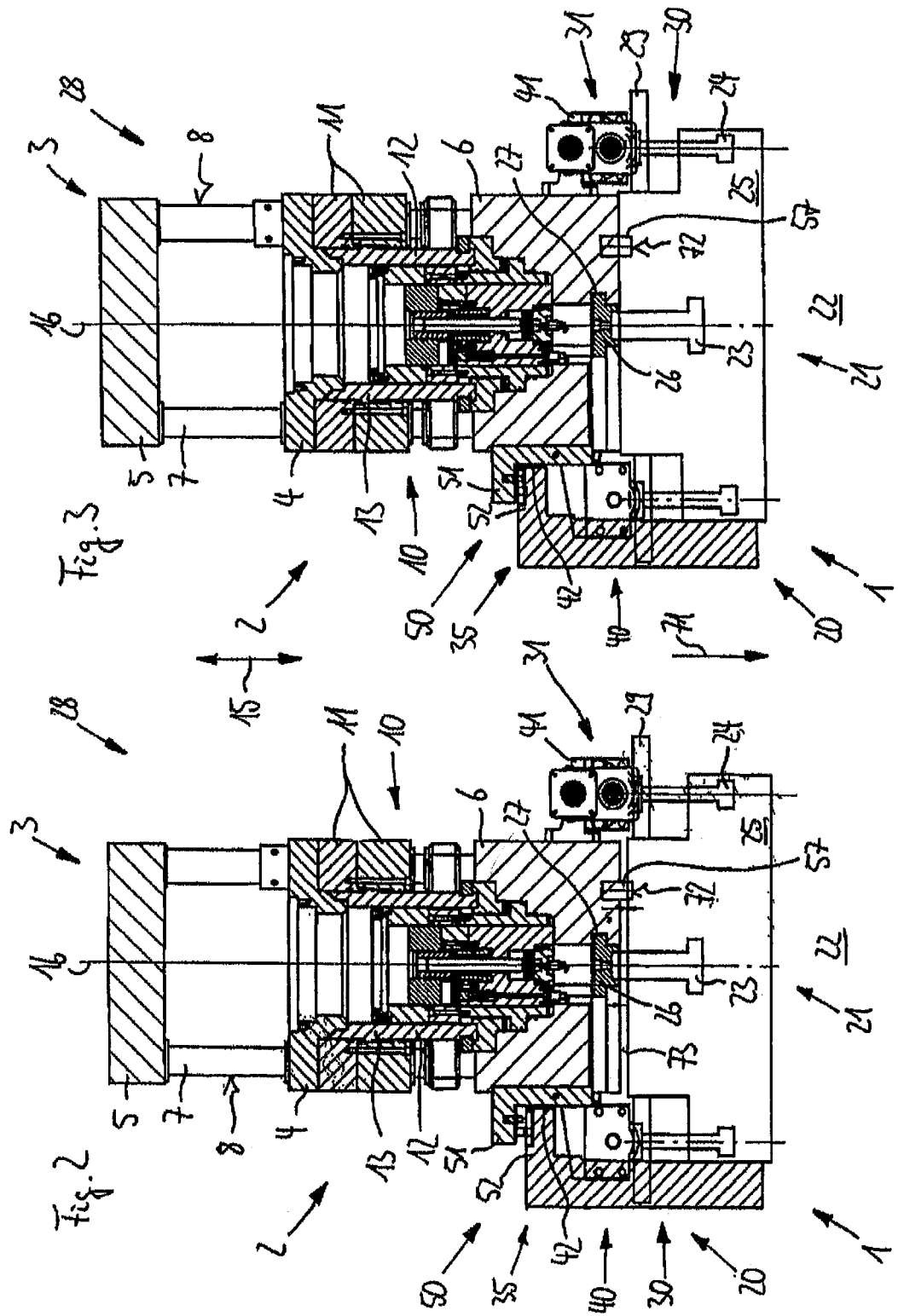

PRESS FOR PRODUCTION OF A MOLDED PART AND METHOD FOR CHANGING A DIE ON A PRESS

CROSS REFERENCE TO RELATED APPLICATIONS

This application is a divisional of and Applicant claims priority under 35 U.S.C. §§ 120 and 121 of U.S. application Ser. No. 14/006,780 filed on Oct. 31, 2013, which application is a national stage application under 35 U.S.C. § 371 of PCT Application No. PCT/DE2012/000311 filed on Mar. 26, 2012, which claims priority under 35 U.S.C. § 119 from German Patent Application No. 10 2011 015 050.1 filed on Mar. 24, 2011, the disclosures of each of which are hereby incorporated by reference. A certified copy of priority German Patent Application No. 10 2011 015 050.1 is contained in parent U.S. application Ser. No. 14/006,780. The International Application under PCT article 21(2) was not published in English.

BACKGROUND OF THE INVENTION

1. Field of the Invention

For one thing, the invention relates to a press for the production of a molded part from a pourable material, using an apparatus for driving a die, comprising a cylinder unit having a cylinder housing and having a cylinder piston. For another, the invention relates to a press for the production of a molded part from a pourable material, using an interchangeable adapter comprising a press unit for accommodating a die. Also, the invention relates to a method for changing a die on a press for the production of a molded part from a pourable material, in which an interchangeable adapter comprising the die can be transferred from a set-up position to a pressing position or vice versa.

2. The Prior Art

In general, presses of the stated type, for the production of a molded part from a pourable material, are well known from the state of the art, particularly in the form of powder presses. In these, the powder to be pressed is filled into a die. Subsequently, the powder situated in the die is compacted to produce the desired molded part, by means of a press punch. Finally, the molded part pressed in this way is ejected from the die and the die can be filled with powder once again.

A hydraulic powder press in this regard is shown, for example, in the Offenlegungsschrift [unexamined patent application published for public scrutiny] DE 28 25 253 A1. The powder press shown there comprises a press bed from which two vertical columns project upward, which carry a common transverse beam at their upper end. A press punch is guided in the transverse beam, which punch works downward in the vertical pressing direction. Above the press bed, a support for a die bowl is provided. One of two press pots of the power press, in each instance, can be attached to the die bowl. The powder that is to be compressed by means of the press punch is filled into the press pots. Although the two press pots are affixed to one of the two vertical columns so as to pivot, it is relatively time-consuming to set the powder press up for a different molded part. In this regard, the powder press also cannot produce for a correspondingly long period of time.

Furthermore, an apparatus for the production of a molded part from powder is known from the patent DE 10 2005 027 296 B3, which apparatus has at least one press punch that can be moved in a pressing direction and at least one die for forming the molded part. Because at least two dies are disposed one above the other, in the pressing direction, in this apparatus, whereby at least one die carries the press punch for an adjacent die, multiple molded parts can be produced at the same time per cycle time, in advantageous manner. In order to also make it easier to set up the apparatus for a different molded part, in this document it is proposed to structure at least the dies together with the press punch as a unit that forms an adapter, which unit can be interchangeably disposed in the apparatus. However, in this connection, contamination of the movement means on the die drive can continue to come about as the result of powder that is lying around, and therefore set-up for changing to different molded parts can be delayed. Furthermore, such contamination can lead to closer maintenance intervals with regard to the die drive.

DE 41 42 352 A1, AT 008 232 U1, JP 58-107401 A and SU 1 771 880 A1 also disclose presses for the production of a molded part from a pourable material, whereby except for the latter document, the dies together with the press punches are configured as a unit that forms an adapter. However, JP 58-107401 A and AT 008 232 U1 disclose relatively complex arrangements, in which, in particular, a traverse is found underneath a base body on which the adapter, in each instance, is displaceably mounted, so that the entire press has a very complicated construction. DE 41 42 352 A1 does not demonstrate this disadvantage, but purely in terms of design, it allows only two such adapters, because these are provided so as to pivot on arms to the side of the actual press, so that the adapters facilitate a change in set-up only with restrictions.

SUMMARY OF THE INVENTION

It is therefore the task of the present invention to further develop presses of the stated type in such a manner that a change to a different molded part or to a different die can be undertaken more rapidly.

According to a first aspect, the task of the present invention is accomplished by a press for the production of a molded part from a pourable material, having an interchangeable adapter that comprises a pressing unit for accommodating a die, and having an apparatus for driving the die, comprising a cylinder unit having a cylinder housing and a cylinder piston, wherein the pressing unit has an upper traverse and a lower traverse that are held at a distance from one another by means of columns, on which a die accommodation plate of the pressing unit is displaceably mounted, and wherein the press is characterized in that the cylinder housing is the actuator of the cylinder unit and the cylinder piston is the stator of the cylinder unit, and the cylinder piston comprises a ring piston that is fixed in place with reference to the cylinder unit.

In contrast to conventional hydraulic cylinders, which are used in known manner as movement means for a die or for a device for accommodating such a die, in the present case it is not a cylinder piston rod that moves with the die, but rather the cylinder housing of the cylinder unit moves with the die. In this regard, the die performs a relative movement with regard to the cylinder piston rod. In advantageous manner, in this way the risk that powder that has gotten into the surroundings of the cylinder unit reaches sensitive components, such as seals of the cylinder, for example, and that as a result, disruptions of function will occur, is significantly reduced. In this regard, the cylinder unit does not need to be maintained as intensively, and thereby it is particularly possible to advantageously reduce the time period for a change in set-up of the press, when replacing an interchangeable adapter. Manual intervention by operating personnel is made superfluous or reduced to a minimum in this way, in advantageous manner.

The term "actuator" describes, in the sense of the present invention, essentially the moving component of the cylinder unit relative to the press, and refers to the function of a die drive within the press. This moving component is the cylinder housing of the cylinder unit, in the present case, on which a die accommodation plate, for example, is attached. In this regard, the term "stator" describes, in the sense of the present invention, the non-moving component of the cylinder unit with regard to a die drive. This non-moving component is the cylinder piston of the cylinder unit, in the present case.

In this connection, the task of the invention is also accomplished by a method for changing a die on a press for the production of a molded part from a pourable material, in which an interchangeable adapter comprising the die can be transferred from a set-up position to a pressing position or vice versa, which method is particularly characterized in that the die is driven by a hydraulic cylinder unit, in which a cylinder housing of the hydraulic cylinder unit is displaced with regard to a cylinder piston of the hydraulic cylinder unit as a stator, and in this way the die is driven by the cylinder housing.

Changing of dies on a press, in particular, can be carried out in particularly simple manner, in terms of process technology, if the die is driven by a hydraulic cylinder unit in which the cylinder housing of the hydraulic cylinder unit, as an actuator, is displaced relative to a cylinder piston of the hydraulic cylinder unit, as a stator, and in this connection the die is driven by the cylinder housing.

The term "interchangeable adapter" describes an apparatus having a frame that comprises at least one die accommodation and one mechanical system in this regard. Preferably, the interchangeable adapter also contains a pressing unit that is usual in presses, which consists essentially of an upper belt, a lower belt, and columns disposed between them.

In the present case, a "pressing position" is understood to mean a position of the adapter within the working region of the press, in which it is ready for operation.

The "set-up position" is a position of the adapter outside of the press, in which either adapters equipped differently or at least the die of an adapter can advantageously be changed and filled with pourable material.

It is understood that the method variant described above can be supplemented and improved by means of further method steps, as will still be explained below.

A preferred embodiment variant of the object provides that the cylinder piston comprises a ring piston that is fixed in place with regard to the cylinder unit. The fixed ring piston is therefore an essential component of the stator on the cylinder unit in this embodiment variant. Because of the fixed ring piston, the cylinder unit in itself already has a very stable construction, so that if necessary, it would be possible to do without additional supporting and guiding components. In alternative embodiment variants, multiple individual pistons could also be provided for the aforementioned purpose.

It is understood that the actuator of the cylinder unit can be guided on the inside and/or outside on the fixed ring piston. Outside guidance on the fixed ring piston is preferred, so that enough construction space for additional components of the present press, such as, for example, an ejection device for the pressed molded part, is available within the fixed ring piston.

If the cylinder housing is displaceable, relative to the cylinder unit, on the outside of the stator of the cylinder unit, preferably disposed to be translationally displaceable, the cylinder housing can be dimensioned in almost any desired manner, at least in the radial direction, without being restricted by the structural dimensions of the stator.

Furthermore, on the basis of the relative large diameter of the fixed ring piston, forces that act between the actuator and the stator can be absorbed well by the cylinder unit.

The cylinder housing can be structured or structurally implemented as an actuator of the cylinder unit, in particularly problem-free manner, if the cylinder housing is disposed fixed in place on a die accommodation of the die.

Furthermore, it is extraordinarily advantageous if the stator and/or the actuator of the cylinder unit is/are disposed concentrically approximately about the center press axis of the press. Such a location selection allows particularly symmetrical introduction of processing or adjustment forces into the cylinder unit, thereby making it possible to build the latter in very compact manner.

The characteristics mentioned above, by themselves, already develop conventional presses further, in advantageous manner.

According to a further aspect of the present invention, the task of the invention is also accomplished by a press for the production of a molded part from a pourable material, having an interchangeable adapter, comprising a pressing unit for accommodation of a die, whereby the press is characterized by a vertical drive for the interchangeable adapter, having a device for raising and/or lowering the interchangeable adapter, whereby the raising and/or lowering device is disposed on the underside of the interchangeable adapter. In this way, too, manual adjustment and/or adaptation work is advantageously eliminated, particularly also in distinction from DE 41 42 352 A1, in which clamping apparatuses are provided to the side and above the lower edge of an interchangeable adapter, in each instance, which apparatuses can press the adapter downward and lower it, in each instance.

The term "vertical drive" describes, in the present sense, an apparatus of the press by means of which the interchangeable adapter can be raised or lowered in the vertical direction. The vertical drive can comprise the most varied drive means, for example drive means that are driven electrically, hydraulically and/or pneumatically.

By means of such a vertical drive for the interchangeable adapter, very rapid loosening or clamping of the interchangeable adapter from or onto the press, respectively, is also possible.

Operationally safe handling of the interchangeable adapter succeeds very well if the raising and/or lowering device for the interchangeable adapter comprises at least one hydraulic cylinder, particularly a hydraulic adapter clamping cylinder, and four hydraulic track cylinders. One hydraulic cylinder can apply sufficient operational forces, without any problem, to hold the adapter or to raise it counter to the force of gravity. Likewise, one hydraulic cylinder can already be sufficient to pull the adapter downward, counter to a raising force, and to secure it in this manner.

If the raising and/or lowering device particularly has such a hydraulic adapter clamping cylinder, the adapter to be interchanged can already be clamped within the press, by means of the hydraulic adapter clamping cylinder, to a sufficient extent so that the pressing process can be carried out in operationally reliable manner after clamping. In this connection, the adapter clamping cylinder can be provided centrally, in a preferred embodiment variant, particularly in the center press axis, and can act on the adapter uniformly, in simple and operationally reliable manner. It is understood that multiple adapter clamping cylinders can also be provided, which engage on the adapter outside the center, in clamping manner.

If the raising and/or lowering device also has hydraulic track cylinders, the complete track or parts of it can advantageously be lowered, at least in the region of the press, thereby making it possible to practice a vertical movement of the adapter in very simple manner. By means of such lowering of the track, the interchangeable adapter can be stabilized within the press in excellent manner, even during a vertical movement. Preferably, four hydraulic track cylinders are in use for this purpose, so that uniform lowering and raising can be implemented in operationally reliable manner. Lowering of the track furthermore makes it possible, with a suitable configuration of the entire arrangement, that further modules on the adapter, which could be necessary with regard to lowering, can be eliminated, to the greatest possible extent, so that the individual adapters have a more cost-advantageous construction.

It is understood that the individual working cylinders can be disposed and act differently, because of their different link geometries. A structurally simple embodiment provides that the hydraulic adapter clamping cylinder and the hydraulic track cylinders are disposed to be oriented essentially parallel to one another, whereby the hydraulic adapter clamping cylinder moves the interchangeable adapter counter to the direction of effect of the hydraulic track cylinders. In this way, the adapter can always be held in close and stable contact with the track surface, thereby increasing the safety of the press during the vertical movement of the adapter.

If a hydraulic adapter clamping cylinder of the vertical drive is disposed essentially centered underneath the interchangeable adapter, the interchangeable adapter can advantageously be grasped centrally and clamped centrally, or driven centrally, accordingly.

The vertical drive can be implemented in the press in particularly space-saving manner if the hydraulic adapter clamping cylinder of the vertical drive is disposed in a machine table of the press.

Furthermore, the hydraulic adapter clamping cylinder can interact with the interchangeable adapter in particularly simple manner if the interchangeable adapter has a recess for clamping means of a hydraulic adapter clamping cylinder on its underside.

The vertical drive, in particular, is structured in advantageous manner if it comprises a height level regulation with a track rail that can be counter-sunk. By means of the proposed height level regulation, the interchangeable adapter can be vertically moved and oriented particularly precisely within the press. In this regard, it is possible that the hydraulic adapter clamping cylinder and the hydraulic track cylinders can be activated by means of the height level regulation. Likewise, other configurations, such as a corresponding spring drive or the like, can be provided for this purpose.

The track rail that can be counter-sunk can be part of the machine table of the press, in this connection, on which the interchangeable adapter is set down, at least in its pressing position, or can surround the table, at least in part. In this manner, the adapter can be moved into its pressing position in simple manner, and also removed from it again. It is understood that the track rail that can be counter-sunk can be configured on the press in many different ways. If the track rail that can be counter-sunk surrounds the machine table of the pressing unit, at least in part, regions of the machine table can be configured so that they can be counter-sunk by means of the track rail, with a simple design.

Furthermore, it is advantageous if the vertical drive has a vertical support for guiding the interchangeable adapter. In this way, the interchangeable adapter can be additionally guided and fixed in place, thereby making it possible to position it more precisely within the press, particularly if the vertical drive then engages.

According to a further aspect of the invention, the task of the present invention is accomplished by a press of the stated type that has a horizontal drive for the interchangeable adapter, with a mobile change-over cart for moving the interchangeable adapter on a track into a working region of the press or out of a working region of the pressing unit, and is characterized in that the horizontal drive comprises a horizontal stop for horizontal guidance of the interchangeable adapter, which stop comprises a coupling part of a hydraulic coupling, which part is fixed in place on the press side. In this way, manual adjustment and/or adaptation work is advantageously eliminated.

The term "horizontal drive" describes, in the sense of the invention, an apparatus by means of which the interchangeable adapter can be moved, particularly from a set-up position to a pressing position.

In advantageous manner, the interchangeable adapter comprises a mobile change-over cart for this purpose, so that even very massive and large pressing units can be moved between the individual positions.

Cumulatively, it is advantageous if the horizontal stop comprises a vertical support that is fixed in place, for the interchangeable adapter. In this way, the press can have a very compact structure and the hydraulic coupling can be closed in operationally reliable manner.

Furthermore, the task of the invention is accomplished, accordingly, by a press of the stated type, which is characterized by a hydraulic coupling having an adapter-side coupling part, having a press-side coupling part, and having a device for coupling the two coupling parts, in which the adapter-side coupling part is displaceable with regard to the press-side coupling part, at least vertically, and in which the press-side coupling part has an additional fixed vertical support for the interchangeable adapter, next to the machine table.

In advantageous manner, the interchangeable adapter can be oriented particularly precisely and fixed in place well, in the press, by means of such a hydraulic coupling. Manual adjustment and/or adaptation work is eliminated, accordingly. Precise orientation of the interchangeable adapter within the press is absolutely necessary in view of the enormously great pressing forces that act on the pressing unit. Otherwise, the press and its components could very quickly be damaged.

Preferably, the coupling device is situated at the side of the pressing unit, so that no construction space is lost in the actual working region of the press, as the result of the coupling device.

If the coupling device comprises not only fixed but also movable coupling elements, coupling of the two coupling parts with one another succeeds in extraordinarily safe manner.

The movable coupling elements can be made available with a simple design if they comprise at least one automatic coupling, because the latter can easily be connected with a hydraulic system of the press that is already present. In this regard, electrical servomotors or the like, for displacement of the movable parts, are not required, but they can be provided cumulatively or alternatively.

The coupling elements that are fixed in place can be advantageously implemented, in terms of design, if the fixed coupling elements comprise simple centering pins for centering the interchangeable adapter with regard to the fixed vertical supports. Preferably, such centering pins are disposed in the immediate vicinity of the coupling device, so that any distortion or offset can be restricted to a minimum.

In particular, centering means, preferably in the form of a recess and an indexing and positioning bolt, can also be provided parallel to the raising and/or lowering device, whereby these means can preferably become active as a supplement to the centering pins. Thus, it is possible, for example, to provide the centering means on a first vertical support, for example on a floor plate, while the centering pins are provided on a further vertical support.

A further advantageous embodiment of the invention provides that the press comprises indexing or positioning bolts for guidance of the interchangeable adapter with regard to the machine table. By means of the indexing or positioning bolts, the interchangeable adapter can already be pre-positioned at the beginning of a lowering process, by means of the vertical drive, on the machine table and in the region of the track, so that the risk that incorrect positioning occurs in the final pressing position is reduced. Particularly in interplay with the coupling described above, in this way it can supplementally be prevented that the coupling elements of the coupling device are not correctly pre-positioned, one above the other, before the first contact, whereby if necessary, precise positioning in the region of the hydraulic coupling can take place by means of the centering pins.

While the coupling apparatus described above is provided at the side of the adapter, in other words preferably in the region of the fixed vertical support, the present indexing and positioning bolts are ideally situated on the underside of the interchangeable adapter. Because of their relatively low construction height, they do not cause any problems there, but allow quick contact with the machine table.

It is also advantageous if the hydraulic coupling simultaneously comprises a horizontal stop for horizontal guidance of the interchangeable adapter, thereby advantageously supporting movement of the interchangeable adapter into the press or limiting its depth.

According to a further aspect, the task of the invention is accomplished by a press for the production of a molded part from a pourable material, having an interchangeable adapter comprising a pressing unit for accommodation of a die, whereby the press is characterized by an automatic change mechanism having sensors for automatic displacement of the interchangeable adapter into a working region of the press or out of the working region of the press.

Such a sensor-supported automatic change mechanism advantageously always guarantees an operationally reliable course of the method, with regard to an exchange of the adapter, in each instance, and this is particularly advantageous with regard to presses having large and heavy pressing units.

It is particularly advantageous if the automatic change mechanism particularly comprises a device for measuring or for controlling the speed of a mobile change-over cart of the interchangeable adapter. Aside from monitoring of the correct travel paths and travel distances of the mobile change-over cart, control of its speed is particularly important, because in this way, the risk that accidents can occur when changing the adapter, due to incorrect speeds, can be reduced. In this regard, work safety is also significantly increased in this way.

Cumulatively or alternatively, the task of the invention is also accomplished by a method for changing a die on a press for the production of a molded part from a pourable material, in which an interchangeable adapter comprising the die can be transferred from a set-up position to a pressing position or vice versa, whereby the method is characterized in that the interchangeable adapter is moved into the pressing position essentially horizontally, then subsequently pre-positioned with regard to a machine table of the press by means of a vertical movement, and additionally centered and coupled on a further vertical support.

This method is particularly characterized by multi-stage coupling of the interchangeable adapter to the press. According to the invention, this multi-stage coupling is achieved essentially only by means of a vertical movement, thereby structuring the replacement of a die or a change in set-up of the press to a new molded part in extremely simple manner. In this regard, the set-up time of the press can be significantly shortened.

A preferred method variant provides that the interchangeable adapter is displaced vertically downward, preferably by means of an adapter clamping cylinder, and in this connection is clamped with regard to the machine table. In this way, the pressing unit can be transferred to a state in which it is ready for operation, quickly and easily.

Also, the interchangeable adapter can be first pre-positioned on the machine table, subsequently centered and coupled on the further vertical support, and clamped with regard to the machine table, all with a single vertical movement. Preferably, this is done with a single, continuous vertical movement, so that the interchangeable adapter can be anchored within the press, in its pressing position, quickly and without problems.

Cumulatively, it is advantageous if the interchangeable adapter, which is moved into the pressing position horizontally, is lowered onto the machine table, whereby the interchangeable adapter, in a first lowering phase, is first pre-positioned on the machine table by means of indexing and positioning bolts, and subsequently, in a further lowering phase, centered and coupled to the further vertical support by means of centering pins, and clamped with regard to the machine table. Such a course of the method significantly reduces the risk of incorrect insertion of the adapter into the press, and is also correspondingly advantageous, independent of the other characteristics of the present invention, for changing a die on a press for the production of a molded part from a pourable material, in which an interchangeable adapter that comprises the die is transferred from a set-up position to a pressing position or vice versa.

Furthermore, in a further method variant, it is advantageously provided that a hydraulic coupling is closed or opened with the vertical movement of the interchangeable adapter.

It is understood that the method variants proposed, in particular, can also be combined with one another as desired, in order to achieve advantageous effects when changing a die of a press.

At this point it should still be noted, for the sake of completeness, that the cylinders described here can also be operated pneumatically, for example, in whole or in part. Likewise, other drives, such as electrical or magnetic drives, for example, are also possible, accordingly.

BRIEF DESCRIPTION OF THE DRAWINGS

Further advantages, goals, and properties of the present invention will be explained using the following description of a powder press for the production of a molded part from a pourable material, which is particularly shown also in the attached drawings. The drawings show:

FIG. 1A schematically, a side view of the press, partly in section, with an interchangeable adapter that has not yet been lowered, in a pressing position;

FIG. 1B schematically, a side view of the press, partly in section, with an interchangeable adapter in a set-up position, before it is moved into the pressing position shown in FIG. 1A;

FIG. 2 schematically, in a further side view, partly in section, of the press from FIGS. 1A and 1B, with the interchangeable adapter partly lowered; and FIG. 3 schematically, a further side view, partly in section, of the press from FIGS. 1A, 1B, and 2, with the interchangeable adapter completely lowered.

DETAILED DESCRIPTION OF THE PREFERRED EMBODIMENTS

A first exemplary embodiment, shown in FIGS. 1 to 3, shows a press 1 for the production of a molded part from a pourable material, having an interchangeable adapter 2 comprising a pressing unit 3 having a die accommodation plate 4 for accommodating a die, not shown here.

The pressing unit 3 has an upper traverse 5 and a lower traverse 6, which are held at a distance from one another by means of columns 7 (numbered only as an example here). In this exemplary embodiment, the columns 7 are configured as slide devices 8 on which the die accommodation plate 4, in particular, can slide and thereby be displaced in height within the pressing unit 3. In this exemplary embodiment, the pressing unit 3 comprises a total of four columns 7.

To drive the die accommodation plate 4, the pressing unit 3 comprises a corresponding apparatus 9 for driving the die, not shown here, or the die accommodation plate 4, which apparatus comprises a cylinder unit 10 having a two-part cylinder housing 11 and having a cylinder piston 12. It is unusual, in this connection, that the cylinder housing 11 is the actuator of the cylinder unit 10 and the cylinder piston 12 is the stator of the cylinder unit 10; in other words, the cylinder housing 11 is the moving part of the cylinder unit 10 and the cylinder piston 12 is the fixed component with regard to the cylinder unit 10.

This means that the cylinder housing 11 is displaced with regard to the cylinder piston 12, thereby making it possible to achieve the enormous advantage that pourable material that is lying around can reach sensitive regions of the cylinder unit 10 in significantly poorer manner, ideally not at all. As a result, the risk of increased wear, for example on sealing devices of a hydraulic system of the cylinder unit 10, is reduced, thereby making it possible to advantageously reduce the maintenance effort and the maintenance frequency.

This also makes significantly faster and more cost-advantageous changing of the die on the press 1 possible, among other things, because the adapter 2 can be replaced significantly faster than was usual until now, as a result of the low maintenance effort.

It is understood that the stator can be implemented in many varied structures. It has proven to be particularly advantageous to configure the cylinder piston as a ring piston 13 that is fixed in place with regard to the cylinder unit 10, as is implemented in the present exemplary embodiment.

In contrast, the cylinder housing 11 is disposed on the outside—shown with the reference number 14—on the stator of the cylinder unit 10, in displaceable manner, preferably in translationally 15 displaceable manner, with regard to the cylinder unit 10.

In this connection, the cylinder housing 11 is firmly connected with the die accommodation plate 4.

Both the stator and the actuator of the cylinder unit 10 are disposed concentrically around the center press axis 16 of the press, in this exemplary embodiment, thereby creating a very stable cylinder unit 10.

According to a further aspect of the present invention, the press 1 is characterized by a vertical drive 20 for the interchangeable adapter 2. The vertical drive 20 comprises a device 21 for raising and/or lowering the interchangeable adapter 2, whereby the raising and/or lowering device 21 is disposed, in this exemplary embodiment, in its essential modules, on the underside—indicated with the reference number 22—of the interchangeable adapter 2.

The raising and/or lowering device 21 is equipped with one hydraulic adapter clamping cylinder 23 and four hydraulic track cylinders 24 (numbered as examples here). Both the adapter clamping cylinder 23 and the track cylinders 24 are provided in a floor plate 25 of the press 1. In this connection, the adapter clamping cylinder 23 is disposed centrally, and the track cylinders 24 are disposed in corner regions of the foundation 25, in each instance.

The adapter clamping cylinder 23 has a clamping head 26 at the top, which can engage into a corresponding undercut 27 of the lower traverse 6, when the interchangeable adapter 2 is moved or has been moved into a pressing position 28. Such a pressing position 28 is shown in FIGS. 1A, 2, and 3.

The floor plate 25, together with the counter-sinkable track rails 29, forms a machine table 30 of the press 1. The counter-sinkable track rails 29 and the hydraulic track cylinders 24 are components of a height level regulation (not explicitly numbered here) of the vertical drive 20 and are essentially oriented parallel to the hydraulic adapter clamping cylinder 23. In this regard, the main directions of action of the hydraulic track cylinders 24 can be oriented counter to the main direction of action of the hydraulic adapter clamping cylinder 23, in structurally simple manner, thereby making it possible to always press the adapter 2 against the counter-sinkable track rails 29 and to thereby hold the interchangeable adapter 2 in firm contact with the counter-sinkable track rails 29 with its chassis 31.

In this exemplary embodiment, the chassis 31 comprises wheels 32 (numbered only as examples here).

It is understood, however, that the chassis 31 can also have a different form, for example can be equipped with a corresponding pneumatic system, thereby allowing the interchangeable adapter 2 to slide over the track 34 between a set-up position 33 (see FIG. 1B) and the pressing position 28.

Good vertical guidance of the interchangeable adapter 2 occurs, in the pressing position 28, also by means of a vertical support 35 of the vertical drive 20, as will be described further below.

For advantageous movement of the interchangeable adapter 2 between the pressing position 28 and the set-up position 33, the interchangeable adapter 2 has a horizontal drive 40 having a mobile change-over cart 41. The interchangeable adapter 2 can thereby be displaced, in advantageous manner, by means of a simple horizontal translational movement between the pressing position 28 and the set-up position 33.

For horizontal guidance of the interchangeable adapter 2, the horizontal drive 40 also comprises a horizontal stop 42, which particularly serves as a move-in limit for the change-over cart 41. In this way, horizontal pre-positioning of the interchangeable adapter 2 can be guaranteed in particularly rapid and operationally reliable manner.

The present press 1 can have a particularly simple construction in that the horizontal stop 42 simultaneously carries the vertical support 35 for the interchangeable adapter 2. If necessary, the horizontal stop 42 can have a sensor system for detection of the position and/or speed of the change-over cart 41 on its side facing the interchangeable adapter 2. Such a sensor system can, however, also be provided at another suitable location, also on the change-over cart 41 or the interchangeable adapter 2. In particular, it is also possible that one part of this sensor system is provided on the horizontal stop 42 or at a different suitable fixed location, while another part is provided on the change-over cart 41 or on the adapter 2, and both of these parts of the sensor system interact with one another.

The press 1 is particularly also developed further by means of an automatic change mechanism, which works together with the sensors mentioned above for automatic displacement of the interchangeable adapter 2 into a working region, in this exemplary embodiment the pressing position 28 of the press 1, or out of the working region of the press 1.

To control the speed of the mobile change-over cart 41 of the interchangeable adapter 2, the automatic change system advantageously possesses a device for controlling the speed. In this regard, the risk of damaging the press 1 or the interchangeable adapter 2 as the result of an unsuitable speed is almost completely excluded, because the change-over cart 41 can then gently drive up to the horizontal stop 42.

With regard to a further aspect of the present invention, the press 1 has a hydraulic coupling 50 with an adapter-side coupling part 51 and with a press-side coupling part 52.

Furthermore, the hydraulic coupling 50 has a device 53 for coupling the two coupling parts 51 and 52, whereby the coupling device 53 has not only fixed coupling elements 54 but also movable coupling elements 55.

The interchangeable adapter 2 can additionally support itself vertically with the adapter-side coupling part 51, for which purpose the adapter-side coupling part 51 is laid down onto the press-side coupling part 52. Centering of the interchangeable adapter 2 in the region of the hydraulic coupling 50 takes place by means of the fixed coupling elements 54. Once the interchangeable adapter 2 has been pre-centered within the press in such a manner, the hydraulic coupling 50 can additionally be coupled by means of the movable coupling elements 55, whereby the movable coupling elements 55 at least comprise an automatic coupling 56 (numbered only in FIG. 1B, for the sake of clarity).

The press-side coupling part 52 is configured with a particularly simple construction by means of the vertical support 35 of the vertical drive 20, whereby the fixed coupling elements 54, as centering pins (not additionally numbered, for the sake of clarity), engage into corresponding bores of the fixed vertical support 35. In this regard, unintentional intrinsic tension of the adapter 2 within the press 1, as the result of which the hydraulic coupling could be subject to overly great stress, is excluded.

Furthermore, in this exemplary embodiment the hydraulic coupling 50 also comprises at least the hydraulic adapter clamping cylinder 23 for vertical displacement of the interchangeable adapter 2 with regard to the machine table 30, so that the adapter-side coupling part 51 and the press-side coupling part 52 can be coupled with one another during lowering of the interchangeable adapter 2. In this regard, in this exemplary embodiment, the hydraulic coupling 50 is also characterized, in its totality, by the hydraulic adapter clamping cylinder 23.

The press 1 furthermore has indexing or positioning bolts 57 for guiding the interchangeable adapter 2 directly on the machine table 30, which bolts can be assigned, in this exemplary embodiment, additionally to the coupling elements 54 and 55 of the coupling device 53 of the hydraulic coupling 50. In this way, the interchangeable adapter 2 can be pre-positioned within the press 1, on the machine table 30, even before the coupling elements 54 and 55 of the coupling device 53 engage between the adapter-side coupling part 51 and press-side coupling part 52, and this can accordingly be advantageous even independent of the hydraulic coupling 50, but, in interplay with the hydraulic coupling 50, particularly protects the other fixed coupling elements 54, such as the centering pins, from overload, so that these can regularly be designed to be more delicate and therefore less robust.

The essential course of the method for changing a die on the press 1 is structured as follows in this exemplary embodiment:

The interchangeable adapter 2 is transferred from the pressing position 28 (see FIG. 1A) to the set-up position 33 (see FIG. 1B). There, either the die can be removed from the die accommodation plate 4 and replaced with a different die, so that subsequently the interchangeable adapter 2 is moved back from the set-up position 33 to the pressing position 28. Or the entire adapter 2 is replaced with a different interchangeable adapter 2, which was previously equipped with a corresponding die. In any case, the adapter 2, correspondingly prepared with the required die, is transferred from the set-up position 33 back to the pressing position 28. In this connection, the interchangeable adapter 2 is rolled, with its wheels 32, over the track 34, onto the counter-sinkable track rail 29, which surrounds the machine table 30 of the pressing unit 3 at least in part. Up to that time, a first interstice 70 with a distance that is selected to be sufficiently large so that the indexing and positioning bolts 57 are situated above the track 34 or above the machine table 30 and that the movement sequences described above can proceed in operationally safe manner exists between the track 34 and/or the counter-sinkable track rail 29 and/or the foundation 25. The distance of the first interstice 70 is determined, in fixed manner, by the selected diameter of the wheels 32, in this exemplary embodiment.

Once the interchangeable adapter 2 has been brought up all the way to the horizontal stop 42 by means of its horizontal drive 40 (see FIG. 1A), the interchangeable adapter 2 is lowered within the press 1, along the center press axis 16, in a first lowering phase (see FIG. 2), by means of the counter-sinkable track rail 29. In this connection, the interchangeable adapter 2 is pre-positioned with regard to the machine table 30, by means of a vertical movement 71 (see FIGS. 2 and 3), in that the indexing and positioning bolts 57 thread into corresponding recesses 72 in the foundation 25.

During the further course of the vertical movement 71, the interchangeable adapter 2 is additionally centered on the vertical support 35 by way of the hydraulic coupling 50, and also hydraulically coupled by means of closing the coupling 50.

The vertical movement 71 is continued until the first interstice 70 (FIGS. 1A and 1B) successively decreases in size (see further interstice 73; FIG. 2), so that ultimately, the interchangeable adapter 2 sits on the floor plate 25 of the press 1 with its lower traverse 6, ready for use, and is clamped on the machine table 30 by means of the hydraulic adapter clamping cylinder 23 (FIG. 3).

The vertical movement 71 downward and upward is essentially initiated by the adapter clamping cylinder 23.

In order to be able to displace the die into an operating position, by means of the die accommodation plate 4, without the risk of excessive contamination by a pourable material existing in this connection, the cylinder housing 11 of the hydraulic cylinder unit 10 is displaced, in the sense of an actuator, with regard to the cylinder piston 12 of the hydraulic cylinder unit 10, thereby causing the die or the die accommodation plate 4 to be driven directly by the cylinder housing 11.

It is understood that the exemplary embodiment explained above is only a first embodiment of the present invention. In this regard, the embodiment of the invention is not restricted to this exemplary embodiment that has been explained.

REFERENCE SYMBOL LIST 1 press
2 interchangeable adapter
3 pressing unit
4 die accommodation plate
5 upper traverse
6 lower traverse
7 columns
8 slide device
9 drive apparatus
10 cylinder unit
11 cylinder housing
12 cylinder piston
13 ring piston
14 outside
15 translational(ly)
16 center press axis
20 vertical drive
21 raising and/or lowering device
22 underside
23 adapter clamping cylinder
24 track cylinder
25 floor plate
26 clamping head
27 undercut
28 pressing position
29 track rail
30 machine table
31 chassis
32 wheels
33 set-up position
34 track
35 vertical support
40 horizontal drive
41 change-over cart
42 horizontal stop
50 hydraulic coupling
51 adapter-side coupling part
52 press-side coupling part
53 device for coupling
54 locally fixed coupling elements
55 movable coupling elements
56 automatic coupling
57 indexing and positioning bolt
70 first interstice
71 vertical movement
72 recesses
73 further interstice

What is claimed is:

1. Press for production of a molded part from a pourable material, having an interchangeable adapter comprising a pressing unit for accommodating a die, comprising a vertical drive for the interchangeable adapter, having a device for raising and/or lowering the interchangeable adapter, wherein the raising and/or lowering device is disposed on the underside of the interchangeable adapter.

2. Press according to claim 1, wherein the raising and/or lowering device for the interchangeable adapter comprises at least one hydraulic cylinder and four hydraulic track cylinders.

3. Press according to claim 2, wherein the hydraulic adapter clamping cylinder and the hydraulic track cylinders are disposed oriented essentially parallel to one another, wherein the hydraulic adapter clamping cylinder moves the interchangeable adapter counter to the direction of effect of the hydraulic track cylinders.

4. Press according to claim 1, wherein a hydraulic adapter clamping cylinder of the vertical drive is disposed essentially centered underneath the interchangeable adapter.

5. Press according to claim 1, wherein a hydraulic adapter clamping cylinder of the vertical drive is disposed in a machine table of the press.

6. Press according to claim 1, wherein the interchangeable adapter has an accommodation for a clamp of a hydraulic adapter clamping cylinder of the vertical drive on its underside.

7. Press according to claim 1, wherein the vertical drive comprises a height level regulation with a track rail that can be counter-sunk.

8. Press according to claim 7, wherein the track rail that can be counter-sunk at least partly surrounds a machine table of the pressing unit.

9. Press according to claim 1, wherein the vertical drive has a vertical support for guiding the interchangeable adapter, which is different from a machine table of the press.

10. Press according to claim 1, further comprising a hydraulic coupling having an adapter-side coupling part, having a press-side coupling part, and having a device for coupling the two coupling parts, in which the adapter-side coupling part is displaceable with regard to the press-side coupling part, at least vertically, and in which the press-side coupling part has an additional fixed vertical support for the interchangeable adapter, next to the machine table.

11. Press according to claim 10, wherein the coupling device comprises not only coupling elements that are fixed in place, but also movable coupling elements.

12. Press according to claim 11, wherein the movable coupling elements comprise at least one automatic coupling.

13. Press according to claim 11, wherein the coupling elements that are fixed in place comprise centering pins for centering the interchangeable adapter with regard to the vertical support that is fixed in place.

14. Press according to claim 10, wherein the hydraulic coupling comprises a horizontal stop for horizontal guidance of the interchangeable adapter.

15. Press according to claim 10, wherein the hydraulic coupling comprises at least one hydraulic cylinder for vertical displacement of the interchangeable adapter with regard to the machine table of the pressing unit, wherein the hydraulic cylinder comprises an adapter clamping cylinder for vertical clamping of the interchangeable adapter.

16. Press according to claim 1, further comprising indexing or positioning bolts for guiding the interchangeable adapter with regard to a machine table of the pressing unit.

17. Press according to claim 2, wherein the at least one hydraulic cylinder comprises a hydraulic adapter clamping cylinder.

\* \* \* \* \*